(12) United States Patent
Hunt

(10) Patent No.: US 11,601,460 B1
(45) Date of Patent: Mar. 7, 2023

(54) CLUSTERING DOMAINS FOR VULNERABILITY SCANNING

(71) Applicant: Microsoft Technology Licensing, LLC, Redmond, WA (US)

(72) Inventor: Adam Hunt, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 694 days.

(21) Appl. No.: 16/524,133

(22) Filed: Jul. 28, 2019

Related U.S. Application Data

(60) Provisional application No. 62/711,523, filed on Jul. 28, 2018.

(51) Int. Cl.
| | | |
|---|---|---|
| *H04L 9/40* | (2022.01) | |
| *G06F 40/14* | (2020.01) | |
| *G06F 9/54* | (2006.01) | |

(52) U.S. Cl.
CPC ............. *H04L 63/1433* (2013.01); *G06F 9/54* (2013.01); *G06F 40/14* (2020.01)

(58) Field of Classification Search
CPC ......... H04L 63/1433; G06F 40/14; G06F 9/54
USPC ........................................................ 715/234
See application file for complete search history.

(56) References Cited

U.S. PATENT DOCUMENTS

| | | | | |
|---|---|---|---|---|
| 10,311,231 B1* | 6/2019 | Kayyoor | ............. | G06F 16/9024 |
| 11,489,860 B2* | 11/2022 | Hunt | ................... | H04L 63/1433 |
| 2008/0091672 A1* | 4/2008 | Gloor | .................... | G06F 16/338 |
| | | | | 707/999.005 |
| 2009/0070366 A1* | 3/2009 | Zhao | .................... | G06F 16/9558 |
| | | | | 707/999.102 |
| 2012/0303398 A1* | 11/2012 | Singh | ..................... | G06Q 10/08 |
| | | | | 705/7.12 |
| 2013/0339290 A1* | 12/2013 | Lee | ......................... | G06F 17/10 |
| | | | | 706/55 |
| 2017/0214589 A1* | 7/2017 | Conover | ................ | G06Q 50/01 |
| 2018/0004855 A1* | 1/2018 | Bolshinsky | ........... | G06F 40/134 |
| 2019/0035027 A1* | 1/2019 | Ng | ............................ | G06Q 40/08 |
| 2019/0354636 A1* | 11/2019 | Hershowitz | ........... | G06F 16/838 |
| 2019/0362278 A1* | 11/2019 | Saraf | .................. | G06Q 10/0635 |
| 2021/0099477 A1* | 4/2021 | Hunt | ................... | H04L 63/1433 |
| 2021/0141897 A1* | 5/2021 | Seifert | ...................... | G06F 9/54 |

OTHER PUBLICATIONS

Weiren Yu et al., More is Simpler: Effectively and Efficiently Assessing Node-Pair Similarities Based on Hyperlinks, published 2013 via Proceeding of the VLDB Endowment, vol. 7, No. 1, pp. 13-24.*

* cited by examiner

*Primary Examiner* — Manglesh M Patel
(74) *Attorney, Agent, or Firm* — Wade IP Law PLLC

(57) ABSTRACT

Website assets are optimized for vulnerability scanning using node centrality techniques. A digital footprint of network nodes associated with a domain is determined. A similarity metric is defined using a weighted linear combination of features of a node. After determining a similarity metric for pairs of related nodes in the digital footprint of a domain, a set of centroids is determined. The reduced set of centroids is acted upon for vulnerability scanning.

20 Claims, 5 Drawing Sheets

CLUSTERING DOMAINS FOR VULNERABILITY SCANNING

PRIORITY CLAIM

This application claims benefit under 35 U.S.C. § 119(e) of Provisional Application No. 62/711,523, filed Jul. 28, 2018, the entire contents of which is hereby incorporated by reference as if fully set forth herein

TECHNICAL FIELD

The present invention relates generally to clustering techniques, and in particular, to reducing computing resources needed in vulnerability scanning.

BACKGROUND

As the use of the Internet and the amount of information available on the Internet has expanded, the ability to track and monitor information available over the Internet related to a particular subject or associated with a particular entity has been negatively impacted. The vast amount of information present on the Internet makes monitoring websites nearly impossible as it is difficult to quickly and efficiently compare the large amount of information contained within the large number of websites that may be associated with an entity. These challenges extend to the enterprise environment, in which an enterprise is faced with the burden of monitoring thousands of web documents accessed throughout an enterprise network including enterprise websites. In an enterprise system having thousands of electronic documents (e.g., documents provided via a website), compliance and security of the enterprise network and the enterprise website becomes difficult to manage.

Of the many challenges faced with network security in any type of computing system (e.g., enterprise system or a cloud computing system), web documents for a website may compromise the security of the enterprise system. Electronic documents for a website may include or implement one or more web components, designed to support a web-based feature, such as content management. For example, web documents may be designed to support a web framework for managing content provided for the web document. The web framework may be defined by multiple, different types of web components. Examples of web frameworks may include proprietary solutions such as WordPress®, Drupal®, Joomla®, and Concrete5®. A web component in an electronic document for a website may undergo several versions through its lifetime. The versions of a website can correspond to changes in a web component due to version changes in a web framework using the web component. The changes in the versions may be difficult to track for a large website. An entity managing a website hosting many web documents may desire to consolidate different web frameworks, or even different versions of web frameworks. The consistency in web frameworks for a website may enable users that manage the website (e.g., an administrator or an operations analyst) to better manage security and operations of a website. By limiting and identifying web framework usage, the security and operation of a website can be improved. Some web components and/or web frameworks may have or expose security vulnerabilities to a website that may go undetected if not discovered in the website. Some websites may implement multiple different web frameworks, each of which may have shared or conflicting vulnerabilities. Some vulnerabilities of a web framework may be exposed by an older version that enable malicious third parties to hide malicious code from an entity's domain names without such entity knowing that any changes have occurred or that such domains have been taken over by malicious code. As such, it is difficult to ensure that bad actors are not altering, misappropriating, and/or otherwise compromising or exploiting data, including ways that interfere with privacy, or damage an entity's intangible business assets, such as intellectual property and goodwill.

Accordingly, businesses are challenged to find ways to accurately and periodically identify and detect changes in a web framework and/or web components of documents hosted by a website. Detecting changes in a web document, in particular web framework changes, becomes paramount in dealing with security of a network, such as a network within an enterprise system. Many web frameworks provide a publicly accessible file in an administrative directory that contains the exact version installed. Using targeted (or active) crawling, the file can be downloaded and the version of the framework determined with little trouble. However, this method may not be feasible for organizations with particularly large footprints. For example, a movie studio may be generating new web content to support upcoming new movies on a monthly or weekly basis, generating hundreds or thousands of websites under the control and management of the movie studio. Scanning for vulnerabilities on all of the websites being generated on a continuous basis is costly, inefficient, and degrades the user experience of the websites due to performance while a website is taken down for vulnerability scanning.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
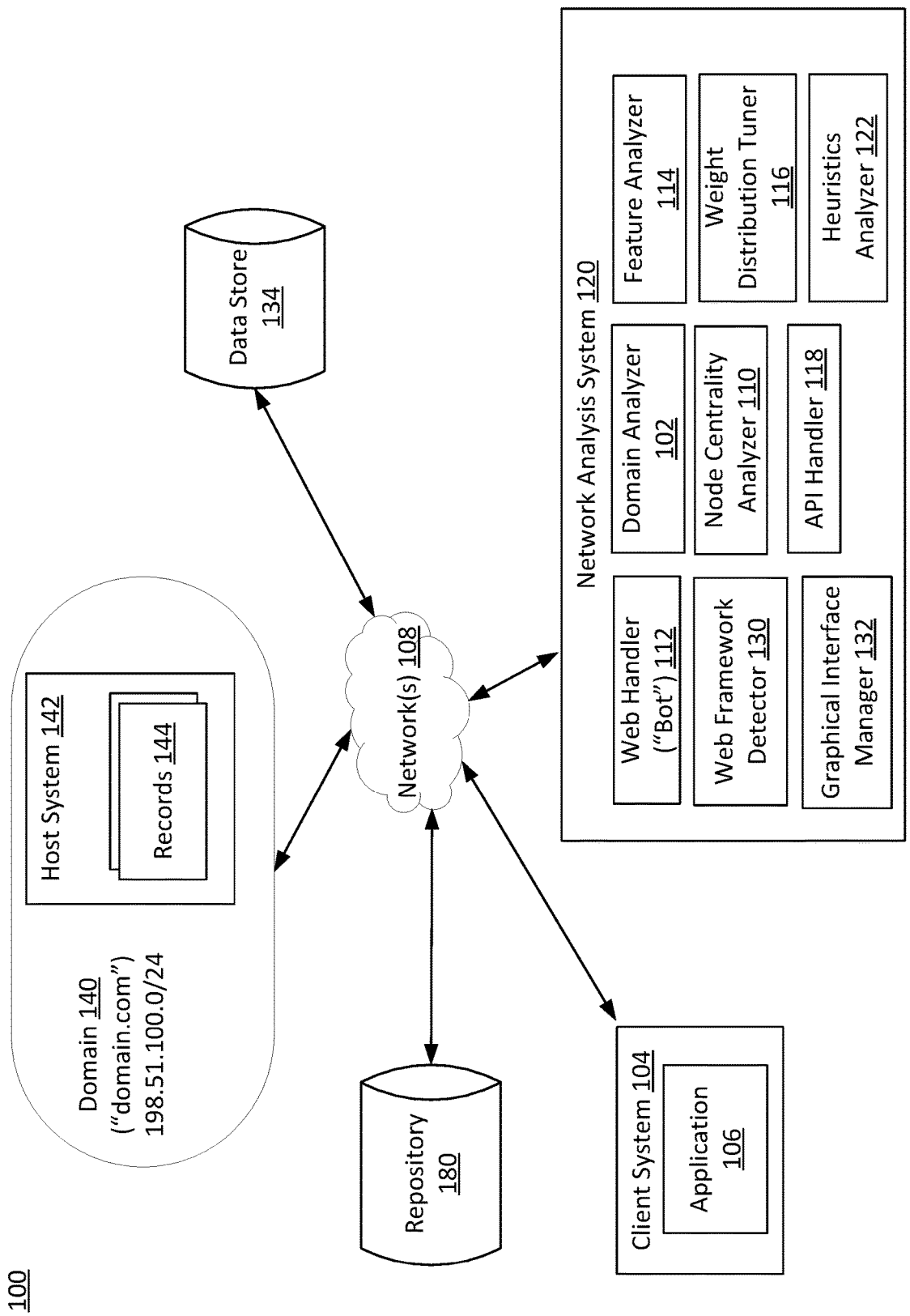
FIG. 1 illustrates an example high-level block diagram, including an example network analysis system.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
3.0. Example Embodiments
4.0 Implementation Mechanism—Hardware Overview
5.0. Extensions and Alternatives

1.0 GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used by a network analysis system to identify opportunities to optimize vulnerability scanning Given a domain name, a list of related nodes, or connected devices on a network, may be detected by the network analysis system. In this way, a digital "footprint" is determined by the network analysis system. In an embodiment, a connected-components algorithm may be used to generate the list of related nodes. A customer may have control over 40,000 to 50,000 websites that they wish to perform a vulnerability scan to determine weakness in the infrastructure of their websites. A document object model (DOM) object is executed for each website and each page component is hashed into a binary signature. This enables the network analysis system to determine the related nodes and clusters of the footprint.

A similarity metric between websites is then defined, where a similarity metric is calculated measure of similarity based on any number of factors, or features. Websites that are similar to each other, meaning they share the same or similar host, software, or other features, have a similarity metric higher than some threshold decided by a customer. For example, node A and node B may represent "lionking.com" and "disney.com" which are both controlled and/or managed by one customer. As a result, node A and node B have a similarity metric of 60% (0.6). Node C may represent "espn.com" such that node B and node C have a similarity metric of 60% but node A and node C may only share a similarity metric of 5% (0.05).

A betweenness centrality algorithm may be used to determine a centroid of a cluster of nodes based on their similarity. Using the highest betweenness centrality measure, node B is selected as the centroid of the cluster because it has the highest similarity score between nodes A, B, and C. In this way, node B may be used as a representative node for the cluster that includes nodes A, B, and C. Centroids are then provided to the vulnerability scanner for detecting weaknesses in the infrastructure. Other centrality measurements, such as a graph centrality measure, node/vertex centrality measure, closeness centrality, or eigenvector centrality, may be used to determine a centroid of a cluster of nodes.

The betweenness centrality analysis may be performed on the list of related nodes to determine a set of centroids, where each centroid is representative of a group of nodes. A similarity metric may be determined based on a number of features shared by nodes. For example, a group of nodes may share similar or same routing protocols, such as Border Gateway Protocol (BGP) prefix Internet Protocol (IP) block, or use the same autonomous systems (AS) on the Internet. Other features that may indicate similarity between nodes may include IP headers, or header information at the beginning of an IP packet. Many different features may be used to compute a similarity metric between two nodes, and the features may be weighted using a linear combination, in an embodiment.

The result of determining a list of centroids from an initial detected list of nodes is reducing the number of website assets to perform vulnerability scanning. Vulnerability scanning is resource-intensive and may cause performance delays on the websites being scanned. As a result, by reducing the number of website assets to be scanned, a performance increase is gained while also ensuring that vulnerabilities in the infrastructure of websites may be captured and identified. Vulnerability scanners may be third-party vendors contracted to perform the vulnerability scans. The reduction of website assets needed to be scanned may be from 50,000 website assets to 2,000 website assets, in one example embodiment. Thus, the vulnerability budget is reduced and website performance is increased.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

FIG. 1 shows a high-level block diagram of a system 100 according to an embodiment of the present disclosure. One or more of the below-described techniques may be implemented in or involve one or more computer systems. The computing environment in FIG. 1 is not intended to suggest any limitation as to scope of use or functionality of described embodiments.

System 100 may include one or more client systems 104 (referred to herein as "client system" or "client") and network analysis system 120. Network analysis system 120 may be implemented by a computing system. Client system 104 may be operated by one or more users (e.g., user 102), such as a network analyst whose role it is to assess network activity.

Client system 104 may include an interface, such as a physical interface, a graphical interface (e.g., a graphical user interface), or a combination thereof. A graphical interface may be generated by client system 104, received from network analysis system 120, or a combination thereof. The graphical interface may be updated or modified by client system 104 or network analysis system 120 in response to interaction with the interface. The interface may be provided by network analysis system 120 via network 108 as part of a service (e.g., a cloud service) or application. In some embodiments, client system 104 may provide access to one or more applications 106 ("app"). App 106 may enable a user to access and perform services provided by network analysis system 120. In some embodiments, app 106 may enable a user, e.g., a network administrator or analyst to control and view web framework monitoring for documents. In particular, app 106 can enable a user to view web framework detection for one or more web documents for a website. The app 106 can provide information indicating the name and version of a web framework used for each page and statistical information generated that indicates a match for the page.

Embodiments are directed to detecting web frameworks and/or web components of documents accurately and periodically. Detecting web frameworks and/or web components may be used to identify security vulnerabilities and assess operational performance of documents for websites. A document object model (DOM) may be used to identify objects in a document to determine fine-grain detection of web components. A hash signature of each object may be generated and compared to a hash signature of each of different web components defining one or more web frameworks. The comparison may be used to accurately determine web components of a document, and a web framework for the document based on those web components. Accordingly, embodiments are capable of identifying, in real-time, web frameworks implemented within a website, or documents generally defined by a model. Thus, embodiments provide a deeper understanding of documents, such as documents of a website. Accordingly, the deeper understanding of documents may enable a user to accurately assess functionality of a website. As such, embodiments provide a deeper understanding of website behavior by analyzing the full activity and functionality associated with a website, email, or other Internet-connected device rendering documents. The functionality may be used to identify security and performance issues with documents. The issues may be used to determine a change in conformity to a particular web component and/or web framework.

A document object model (DOM) is a platform-neutral and language-neutral interface that allows programs and scripts to dynamically access and update the content, structure and style of documents. The documents may include any data that can be exchanged and stored by computer environments. For example, a document may include received hypertext markup language (HTML) code or extended markup language (XML) for a webpage. Documents may be electronic documents that include data defining content. A document may include a web document (e.g., a web page), an email document, an attachment document, or any other document that may be defined by a DOM. A document as referred to herein may be referred to as a web document, which is accessible via a network. A document may be stored on a computer (e.g., server computer). The document may be accessible at a location, such as a location defined by a uniform resource locator (URL). The location may be used to retrieve or access the document.

A DOM object may be generated based on the DOM. The DOM object may define the logical structure of documents and the way a document is accessed and manipulated through a tree structure, called a DOM tree. The document can be further processed and the results of that processing can be incorporated back into the presented page to provide an updated DOM object. The DOM object allows applications dynamically access, interact, and update information received from one or more server computers providing documents, such as documents for a website. A DOM object may be used to identify node objects, or objects in a document. Some objects may be defined as a web component.

A web component may define an object in a document defined by a DOM. A web component may be a widget that is reusable for providing functionality or content to a document. A web component may specify a location or a source of content (e.g., code or data) in a document. Examples of web components may include, without limitation, JavaScript, cascading style sheets (CSSs), or images.

A web framework may be a programming framework supporting functionality for documents in applications including web applications (e.g., web services, web resources, and web application programming interfaces (APIs)). A web framework may define a common functionality for web documents. A web framework may be defined by one or more libraries and templates. A web framework may be hosted in a system by a provider of the web framework, or a repository system that provides access to the framework.

Client system 104 and network analysis system 120 may be communicatively connected via one or more communication networks 108. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols, such as IEEE 802.XX suite of protocols, TCP/IP, IPX, SAN, AppleTalk, Bluetooth®, and other protocols.

Network analysis system 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analysis system 120 may run any of a number of operating systems or a variety of additional server applications and/or mid-tier applications, such as HTTP servers, FTP servers, CGI servers, Java servers, database servers, and the like. Exemplary database servers include without limitation those commercially available from Microsoft, and the like. In one example, network analysis system 120 may include a RiskIQ™ product or service, which provides digital footprint management or monitoring of network activity with regard to network assets. In various embodiments, network analysis system 120 may be configured to run one or more services or software applications described in the foregoing disclosure. For example, network analysis system 120 may correspond to a computing system for performing processing as described herein according to an embodiment of the present disclosure.

In some embodiments, network analysis system 120 may be implemented as an enterprise computing system or a cloud computing system comprising one or more computers and/or servers that may include those described above. Network analysis system 120 may include several subsystems and/or modules, including some, which may not be shown. For example, network analysis system 120 may include web framework detector 130, web handler ("BOT") 112, graphical interface manager 132, domain analyzer 102, node centrality analyzer 110, feature analyzer 114, weight distribution tuner 116, API handler 118, and heuristics analyzer 122. Network analysis system 120 may have more or fewer subsystems and/or modules than shown in the figure, may combine two or more subsystems and/or modules, or may have a different configuration or arrangement of subsystems and/or modules. Subsystems and modules of network analysis system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analysis system 120 may also provide other services or software applications that can include non-virtual and virtual environments. In some embodiments, these services may be offered as web-based or cloud services or under a Software as a Service (SaaS) model to the users of client system 104. The services offered by network analysis system 120 may include application services. Application services may be provided by network analysis system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analysis system 120, which may be implemented as a cloud infrastructure system. Users can acquire the application services without the need for customers to purchase separate licenses and support. Various different SaaS services may be provided. Users operating client system 104 may in turn utilize one or more applications to interact with network analysis system 120 to utilize the services provided by subsystems and/or modules of network analysis system 120.

Network analysis system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in network analysis system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some embodiments, computer-readable storage media may be configured to protect a computer from an electronic communication containing malicious code. The computer-readable storage media may include instructions stored thereon, that when executed on a processor, perform the operations described herein.

System 100 may also include or be coupled to one or more data sources, which may be implemented using any type of persistent storage device, such as a memory storage device or other non-transitory computer readable storage medium. In some embodiments, local storage may include or implement one or more databases (e.g., a document database, a relational database, or other type of database), one or more file stores, one or more file systems, or combinations thereof. For example, system 100 may be coupled to or may include one or more data sources or repositories such as repository system 180. The repository system 180 may be controlled by a third party. Examples of repository systems include, without limitation, GitHub® and Apache Subversion® (SVN). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources may be accessible by network analysis system 120 using network 108.

System 100 may also include or be coupled to additional storage, which may be implemented using any type of persistent storage device, such as a memory storage device or other non-transitory computer readable storage medium. In some embodiments, local storage may include or implement one or more databases (e.g., a document database, a relational database, or other type of database), one or more file stores, one or more file systems, or combinations thereof. For example, system 100 may be coupled to or may include one or more data stores, such as data store 134. Data store 134 may be included in or accessible network analysis system 120. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be a network-accessible store accessible by network analysis system 120 using network 108.

Data store 134 can be used to store and manage information about web framework detection. The processes of storing disclosed herein may be implemented using data store 134. Data store 134 may be implemented as a database that can be queried. For example, data store 134 can be queried to identify hash signatures that match a hash signature of web component as described below. The name and the version of a web framework can be identified by association with the hash signatures stored for the web framework. The results of the processes disclosed herein may be stored in data store 134 that may be searchable, modifiable, and accessible by network analysis system 120. Client system 120 may access data stored in data store 134 using app 106.

System 100 may include one or more network domains (e.g., an Internet domain), such as domain 140. Domain 140 may provide one or more websites. Each domain may be implemented by a host system, which implements a domain name server (DNS) for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 may be mapped (e.g., via DNS) to one or more IP addresses.

System 100 may implement one or more techniques for web crawling. For example, network analysis system 120 may implement a web handler 112 (e.g., a "bot") to handle communications on the network 108. Web handler 112 may communicate with elements in system 100. Specifically, web handler 112 can send requests (also referred to herein as "dependent requests" and "web requests") for each web component identified in a document. Web handler 112 can receive responses (also referred to herein as "web responses" and "dependent responses") to requests. A request for a web component may be sent to a source specified by an object in a document defined by the web component. The response may be received from a source. The source may be the same as a source of a document that includes the web component. The source can be different from a source of the document. Web handler 112 can crawl the Internet, in particular websites, such as a website provided by host system 142. Web handler 112 may be implemented by or as a part of network analysis system 120, or may be initiated on network 108.

Web handler 112 may passively or actively crawl the Internet for websites. Web handler 112 may mimic operation of a web application (e.g., a web browser) to render webpages. For example, web handler 112 may cause web documents (e.g., web pages) of a website to be rendered. Web handler 112 may actively monitor websites by probing a host system 142 of a website for a configuration file or information about a website, including web frameworks that are used. However, such techniques may be obstructive and unreliable. Web handler 112 may implement passive techniques to assess a website for web framework. For example, web handler 112 may send requests (e.g., dependent requests) and receive responses (e.g., dependent responses) for accessing a web component. Such web requests may be dependent on a web framework for a web document. Web handler 112 may passively monitor web requests for web documents of a website. Web handler 112 may perform operations disclosed herein for monitoring web documents and web requests.

The network analysis system 120 may include other functionality described in related applications, including "Techniques for Web Framework Detection," U.S. Published Patent Application No. 2017/0308513, filed on Apr. 26, 2017 and "Identifying Phishing Websites Using DOM Characteristics," U.S. Pat. No. 9,578,048, filed on Nov. 11, 2015, both hereby incorporated by reference. As disclosed in further detail therein, network analysis system 120 can access files defining one or more known web frameworks. The files can be accessed from repository 180. Network analysis system 120 can generate a hash signature for each file of a web framework by applying a hash function to the file. The hash signatures for the files of each of the different web frameworks can be compared to the hash signature of each web request for one or more web pages. Network analysis system 120 can identify a closest matching web framework by comparing the hash signatures of the web requests for one or more web documents to the hash signatures of each of the web frameworks. Graphical interface manager 132 may perform operations disclosed herein for generating, displaying, and presenting a graphical interface.

A domain analyzer 102 receives a list of domain names to analyze for possible optimizations, in an embodiment. As mentioned above, a network analysis system 120 may use various methods to determine a digital footprint of a domain. This footprint may include a list of domain names under the control and/or management of a customer. The domain analyzer 102 may generate an enumerated listing of nodes representing the domains as well as web components of the domains. As a result, a complete digital footprint is produced by the domain analyzer 102 and/or a combination of the techniques mentioned above.

A node centrality analyzer 110 performs a betweenness centrality measurement between nodes to determine a centroid of a cluster of nodes. For example, the node having the highest betweenness centrality measurement based on the similarity metrics calculated between pairs of nodes is selected as the centroid by the node centrality analyzer 110. In other embodiments, selection of a centroid may be based on other criteria. Vertices in a cluster may be ranked by the centrality measure and then other business criteria may be applied to select a centroid. For example, some customers may only want web sites with a 200 response code. If the vertex with the highest centrality measure has a 300 response code, the business criteria (e.g., a rule such as only selecting web sites with a 200 response code) may be applied such that that vertex with the highest centrality measure having a 300 response code is skipped. Another example of business criteria is excluding web sites that have been scanned within the last month or quarter and submitting the vertex with the next highest centrality measure.

A similarity metric is defined as a weighted linear combination of features. A feature analyzer 114 determines how similar two nodes are based on a particular feature. For example, if two nodes share the same BGP prefix IP block, then they may have a feature score of 1 for that feature. Many different features may be used to define the similarity metric. Each feature may be weighted by a customer and/or administrator of the network analysis system 120. A weight distribution tuner 116 may be used to adjust the weight of each feature in the linear combination that defines the similarity metric. A graphical user interface may be used to tune the weights for features in the defined similarity metric, in an embodiment. The graphical interface manager 132 may provide such a graphical user interface, in an embodiment.

An API (application programming interface) handler 118 may be used to receive data from other systems connected to the network analysis system 120 through one or more networks 108. For example, a client system 104 may, through the application 106, communicate a different weight to be used for a feature in the similarity metric. The API handler 118 may receive that information related to the different weight and pass that weight to the weight distribution tuner 116. Other APIs may be used to receive and transmit data at the network analysis system 120 to connected systems through one or more networks 108, in various embodiments.

A heuristics analyzer 122 uses a set of heuristics, or rules, to handle one or more various situations. For example, an identifier may be used to identify a particular set of nodes, but may not actually represent a host system or connected device. A heuristic is used to ignore such an identifier in the connected components analysis. As another example, a potential threat actor may send the same phishing kit with minor changes in page content, such as a logo change, but keeping many of the same web components, such as redirects and links to malicious content. A heuristic may be used to determine that the set of related nodes to a known phishing kit may be tied to a potential threat actor.

Figure 2:
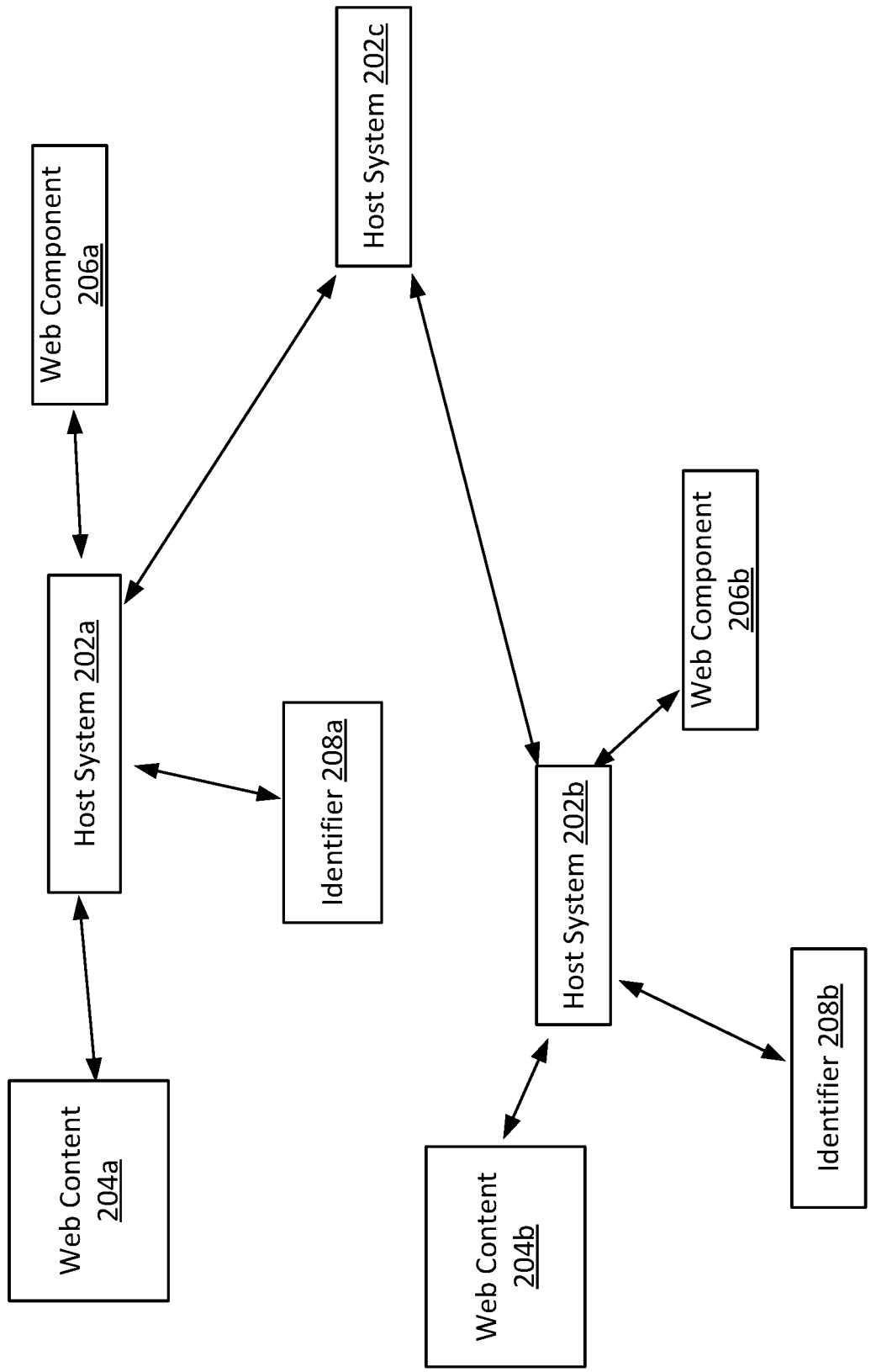
FIG. 2 illustrates an example high-level block diagram.

FIG. 2 illustrates an example high-level block diagram, in an embodiment. A host system 202a is determined to be connected to a web content 204a and a web component 206a using a connected components analysis, in one embodiment. Returning to a previous example, a host system 202a may represent "LionKing.com" which includes web content 204a (e.g., text, images, audio/visual content, and the like) and a web component 206a (e.g., input/output components, iFrames, tables, and so on). It is understood that while only three nodes exist for host system 202a, web content 204a. and web component 206a, a multitude of nodes may be discovered and/or detected by a web framework detector 130 (130 of FIG. 1). The nodes illustrated in FIG. 2 are provided for simplicity and clarity.

The host system 202a is also connected to an identifier 208a and a host system 202c. For example, the identifier 208a may indicate that "LionKing.com" is controlled and managed by DISNEY. Additionally, the host system 202c may represent "Disney.com" and the network analysis system 120 may determine that connection. The host system 202c is also connected to a host system 202b, which in our example above, may represent "espn.com," another website property under the control and/or management of DISNEY. The host system 202b is connected to a web content 204b and a web component 206b as well as an identifier 208b. The network analysis system 120 determines the digital footprint of a domain, such as host system 202a, by determining a list of related nodes in a graph, as illustrated in FIG. 2.

Once the digital footprint is determined by the network analysis system 120, a similarity metric may be used to determine the similarity between nodes. Based on the betweenness centrality algorithm, a centroid may be selected as the node having the highest betweenness centrality measure. Here, the host system 202a and the host system 202c may be determined to be similar because the same software is used to produce and deliver the content, even if the actual content is different. Furthermore, host system 202c may also be determined to be similar to host system 202b for the same reasons. Using betweenness centrality measures, host system 202c is selected as the centroid of the nodes displayed in FIG. 2.

3.0 EXAMPLE EMBODIMENTS

Figure 3:
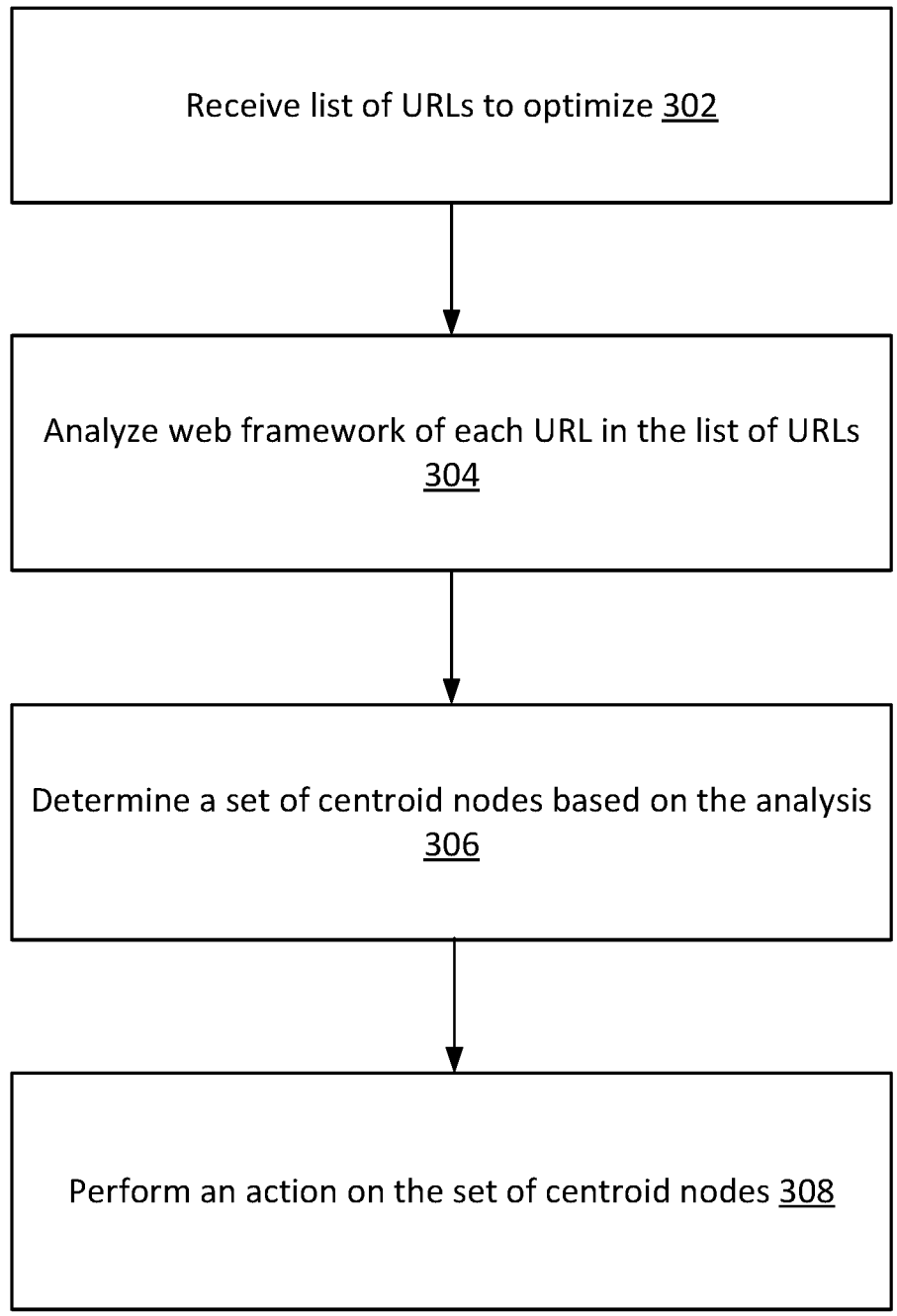
FIG. 3 illustrates an example process flow.

FIG. 3 illustrates an example process flow that may be implemented by a computing system (or device) as described herein. In block 302, a domain analyzer 102 (e.g., 102 of FIG. 1, etc.) receives a list of URLs (Uniform Resource Locators) to optimize. Here the domain analyzer 102 may receive the list from other components of the network analysis system 120. A URL such as "http://www.domain com" includes a domain name Here, that is "domain com".

In block 304, the domain analyzer 102 (e.g., 102 of FIG. 1, etc.) analyzes a web framework of each URL in the list of URLs. This may include executing a DOM object for each domain to perform the analysis of the web framework of each domain, identifying web content and web components connected to the host system that serves the domain as a website.

In block 306, a set of centroid nodes is determined based on the analysis by the domain analyzer 102 and other techniques described with respect to the network analysis system 120. For example, a node centrality analyzer 110 may determine the highest betweenness centrality node for each cluster of related nodes as determined by the domain analyzer 102. Further, the feature analyzer 114 and heuristics analyzer 122 may help determine a similarity metric for each pair of connected nodes which is used by the node centrality analyzer 110 to determine the set of centroid nodes.

In block 308, an action is performed on the set of centroid nodes. For example, an API handler 118 may communicate identifying information about the set of centroid nodes to a third-party vendor for vulnerability scanning through one or more networks 108. As another example, a heuristics analyzer 122 may generate a tag for each centroid node that identifies that node as the centroid node for a group or cluster of related nodes. As a further example, a heuristics analyzer 122 may determine that a node that is a known phishing kit or is connected to malicious web content is similar to a group of nodes that are connected to a potential threat actor. The potential threat actor may be tagged and a notification may be sent to an administrator of the network analysis system 120 through a graphical interface manager 132.

Figure 4:
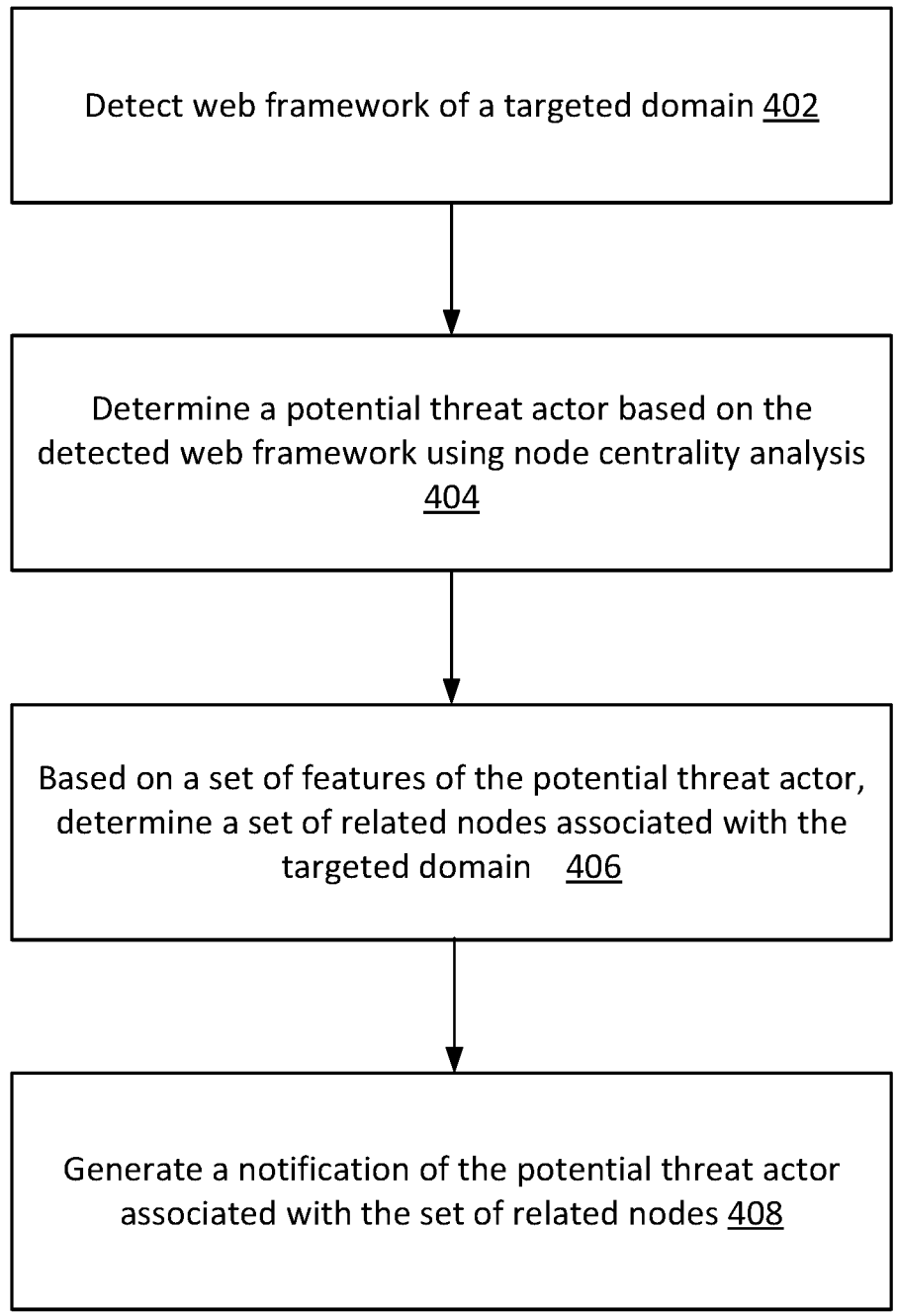
FIG. 4 illustrates an example process flow.

FIG. 4 illustrates another example process flow that may be implemented by a computing system (or device) as described herein. In block 402, a web framework of a targeted domain is detected by a web framework detector 130 (e.g., 130 of FIG. 1, etc.).

In block 404, a potential threat actor is determined based on the detected web framework using node centrality analysis performed by a node centrality analyzer 110.

In block 406, based on a set of features of the potential threat actor, a set of related nodes associated with the targeted domain is determined by the domain analyzer 102 and by the feature analyzer 114. For example, the potential threat actor may be a host system operating out of Lithuania with a particular set of IP addresses. Related nodes may be determined based on having the same set of IP addresses, a feature of the potential threat actor, for example. Any number of features may be used as the set of features that characterize the potential threat actor, in an embodiment.

In block 408, a notification of the potential threat actor associated with the set of related nodes is generated by the network analysis system 120. The notification may be a graphical image and/or a text alert on a graphical interface provided by a graphical interface manager 132, or an application notification on a client system 104 communicated through an API as provided by an API handler 118, in various embodiments.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
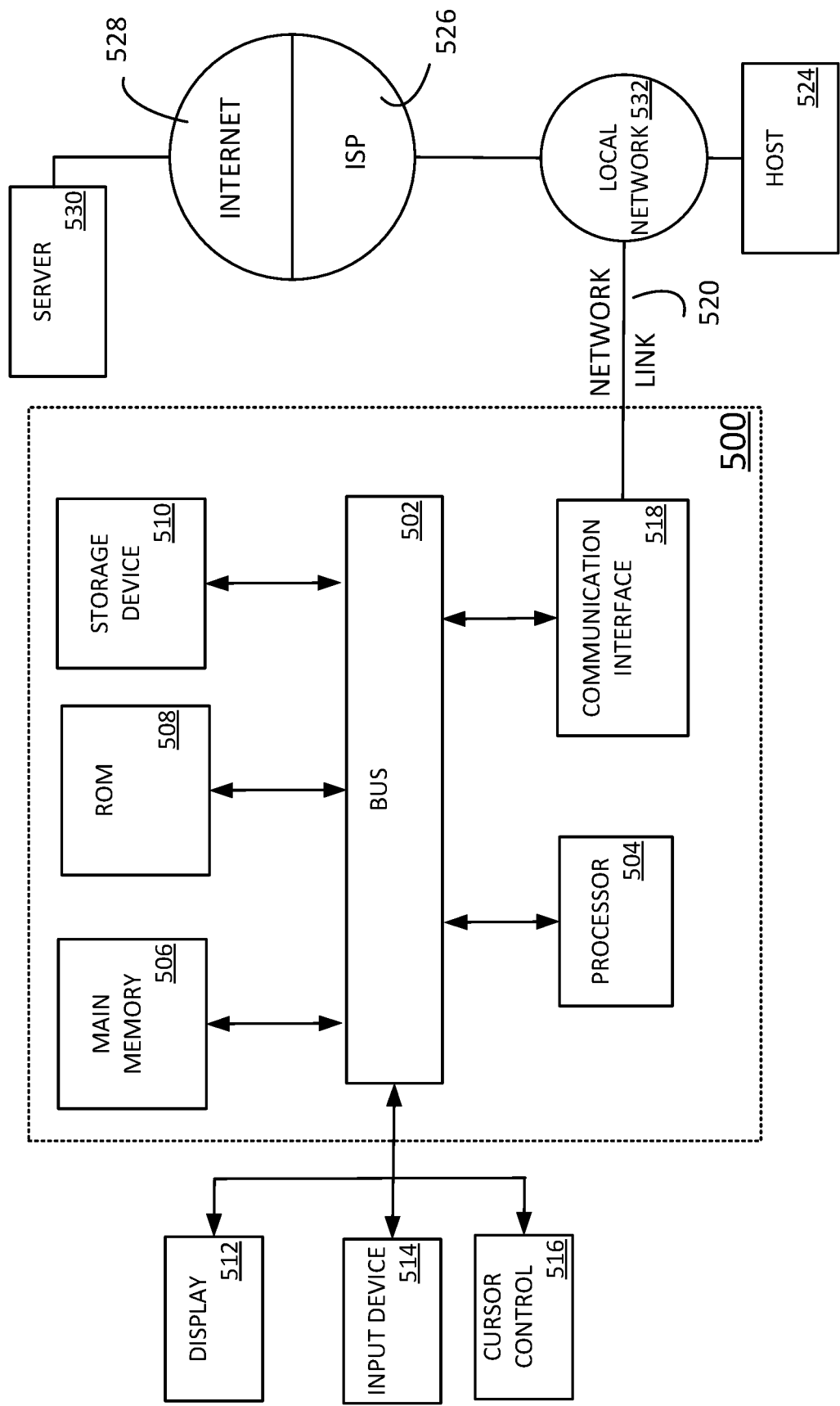
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   detecting, at a network analysis system, a set of related nodes associated with a target domain;
   defining a similarity metric comprising a weighted linear combination of one or more features;
   calculating similarity scores associated with respective pairs of related nodes in the set of related nodes based on the similarity metric;
   determining a betweenness centrality measure for each related node in the set of related nodes based on a respective subset of the similarity scores that is associated with the respective related node;
   selecting a centroid node from the set of related nodes based on the centroid node having a betweenness centrality measure that is higher than the betweenness centrality measure of each other related node in the set of related nodes; and
   performing an action on the centroid node at the network analysis system.

2. The method of claim 1, wherein the set of related nodes is detected by executing a document object model (DOM) object associated with the target domain and hashing each page component into a binary signature.

3. The method of claim 1, wherein the similarity metric is further defined based on one or more heuristics in the weighted linear combination.

4. The method of claim 1, wherein a related node is determined as connected to a potential threat actor and wherein the action comprises tagging the potential threat actor as associated with the centroid node.

5. The method of claim 1, wherein the one or more features includes routing protocols, autonomous systems, internet protocol (IP) header information, or business criteria.

6. The method of claim 1, further comprising storing the similarity scores associated with the respective pairs of related nodes in a data store associated with the network analysis system.

7. The method of claim 1, further comprising:
   receiving a new weight associated with a particular feature of the one or more features, the new weight received through an application programming interface (API); and
   updating the weighted linear combination of the one or more features with the new weight associated with the particular feature.

8. One or more non-transitory computer-readable storage media, storing one or more sequences of instructions, which when executed by one or more processors cause performance of:
   detecting, at a network analysis system, a set of related nodes associated with a target domain;
   defining a similarity metric comprising a weighted linear combination of one or more features;
   calculating similarity scores associated with respective pairs of related nodes in the set of related nodes based on the similarity metric;
   determining a betweenness centrality measure for each related node in the set of related nodes based on a respective subset of the similarity scores that is associated with the respective related node;
   selecting a centroid node from the set of related nodes based on the centroid node having betweenness centrality measure that is higher than the betweenness centrality measure of each other related node in the set of related nodes; and
   performing an action on the centroid node at the network analysis system.

9. The one or more non-transitory computer-readable storage media of claim 8, wherein the set of related nodes is detected by executing a document object model (DOM) object associated with the target domain and hashing each page component into a binary signature.

10. The one or more non-transitory computer-readable storage media of claim 8, wherein the similarity metric is further defined based on one or more heuristics in the weighted linear combination.

11. The one or more non-transitory computer-readable storage media of claim 8, wherein a related node is determined as connected to a potential threat actor and wherein the action comprises tagging the potential threat actor as associated with the centroid node.

12. The one or more non-transitory computer-readable storage media of claim 8, wherein the one or more features includes routing protocols, autonomous systems, internet protocol (IP) header information, or business criteria.

13. The one or more non-transitory computer-readable storage media of claim 8, wherein the one or more sequences of instructions, when executed by one or more processors, cause performance of:
   storing the similarity scores associated with the respective pairs of related nodes in a data store associated with the network analysis system.

14. The one or more non-transitory computer-readable storage media of claim 8, wherein the one or more sequences of instructions, when executed by one or more processors, cause performance of:
   receiving a new weight associated with a particular feature of the one or more features, the new weight received through an application programming interface (API); and
   updating the weighted linear combination of the one or more features with the new weight associated with the particular feature.

15. An apparatus, comprising:
   a subsystem, implemented at least partially in hardware, that detects, at a network analysis system, a set of related nodes associated with a target domain;
   a subsystem, implemented at least partially in hardware, that defines a similarity metric comprising a weighted linear combination of one or more features;
   a subsystem, implemented at least partially in hardware, that calculates similarity scores associated with respective pairs of related nodes in the set of related nodes based on the similarity metric;
   a subsystem, implemented at least partially in hardware, that determines a betweenness centrality measure for each related node in the set of related nodes based on a respective subset of the similarity scores that is associated with the respective related node;

a subsystem, implemented at least partially in hardware, that selects a centroid node from the set of related nodes based on the centroid node having a betweenness centrality measure that is higher than the betweenness centrality measure of each other related node in the set of related nodes; and a subsystem, implemented at least partially in hardware, that performs an action on the centroid node at the network analysis system.

16. The apparatus as recited in claim 15, wherein the set of related nodes is detected by executing a document object model (DOM) object associated with the target domain and hashing each page component into a binary signature.

17. The apparatus as recited in claim 15, wherein the similarity metric is further defined based on one or more heuristics in the weighted linear combination.

18. The apparatus as recited in claim 15, wherein a related node is determined as connected to a potential threat actor and wherein the action comprises tagging the potential threat actor as associated with the centroid node.

19. The apparatus as recited in claim 15, further comprising a subsystem, implemented at least partially in hardware, that stores the similarity scores associated with the respective pairs of related nodes in a data store associated with the network analysis system.

20. The apparatus as recited in claim 15, further comprising:

a subsystem, implemented at least partially in hardware, that receives a new weight associated with a particular feature of the one or more features, the new weight received through an application programming interface (API); and a subsystem, implemented at least partially in hardware, that updates the weighted linear combination of the one or more features with the new weight associated with the particular feature.

* * * * *